United States Patent
Chang et al.

(10) Patent No.: US 7,386,994 B2
(45) Date of Patent: Jun. 17, 2008

(54) OIL SEPARATOR AND COOLING-CYCLE APPARATUS USING THE SAME

(75) Inventors: Seung Yong Chang, Seoul (KR); Yoon Been Lee, Seoul (KR); Sung Chun Kim, Seoul (KR); Se Dong Chang, Kqangmyung-si (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 11/034,779

(22) Filed: Jan. 14, 2005

(65) Prior Publication Data

US 2006/0112724 A1  Jun. 1, 2006

(30) Foreign Application Priority Data

Feb. 25, 2004  (KR) ............... 10-2004-0012579

(51) Int. Cl.
*F25B 43/02* (2006.01)
(52) U.S. Cl. .......................... 62/470; 62/473
(58) Field of Classification Search ............... 62/470, 62/471, 473, 84, 194, 468; 55/459.1, 318, 55/336, 338.1
See application file for complete search history.

(56) References Cited

U.S. PATENT DOCUMENTS

| | | | | |
|---|---|---|---|---|
| 3,504,804 A | * | 4/1970 | Arnold et al. | 210/512.1 |
| 3,778,984 A | | 12/1973 | Lawser | |
| 4,147,630 A | * | 4/1979 | Laval, Jr. | 210/137 |
| 4,559,068 A | * | 12/1985 | Lagerstedt et al. | 55/399 |
| 4,906,264 A | | 3/1990 | Szymaszek et al. | |
| 5,113,671 A | * | 5/1992 | Westermeyer | 62/468 |
| 6,129,775 A | * | 10/2000 | Conrad et al. | 55/337 |
| 6,475,256 B2 | * | 11/2002 | Matsubara et al. | 55/337 |
| 6,497,114 B1 | | 12/2002 | Strikis et al. | |
| 6,574,986 B2 | * | 6/2003 | Morimoto et al. | 62/470 |
| 6,640,559 B1 | | 11/2003 | McQuade | |
| 6,959,557 B2 | * | 11/2005 | Manole et al. | 62/149 |
| 2002/0100291 A1 | | 8/2002 | Strikis et al. | |
| 2002/0134102 A1 | | 9/2002 | Morimoto et al. | |

FOREIGN PATENT DOCUMENTS

| | | | |
|---|---|---|---|
| CN | 1388888 A | | 1/2003 |
| JP | 9-126598 A | * | 5/1997 |
| JP | 10-185367 A | * | 7/1998 |
| JP | 2001 012909 A | | 1/2001 |
| JP | 2004 077033 A | | 3/2004 |
| KR | 2002-0070965 A | | 9/2002 |
| KR | 2003-0067266 A | | 8/2003 |

* cited by examiner

*Primary Examiner*—Mohammad M Ali
(74) *Attorney, Agent, or Firm*—Birch, Stewart, Kolasch & Birch, LLP

(57) ABSTRACT

Disclosed herein are an oil separator and a cooling-cycle apparatus using the oil separator. To a casing of the separator is connected an inflow tube to supply gaseous refrigerant and oil into the casing for allowing them flowing in a swirl pattern, thereby being separated from each other in a cyclone separation manner. Such a separation manner results in an improved oil separation efficiency.

3 Claims, 6 Drawing Sheets

OIL SEPARATOR AND COOLING-CYCLE APPARATUS USING THE SAME

BACKGROUND OF THE INVENTION

1. Field of the Invention

The present invention relates to an oil separator for separating oil from gas and a cooling-cycle apparatus using the oil separator, and more particularly, to an oil separator for separating oil from gas in a cyclone separation manner, and a cooling-cycle apparatus using the oil separator.

2. Description of the Related Art

As well known to those skilled in the art, a cooling-cycle apparatus is an apparatus installed in an air conditioner, refrigerator, etc. for cooling or warming a room, or keeping food at low temperatures.

FIG. 1 is a diagram of a conventional cooling-cycle apparatus.

As shown in FIG. 1, the cooling-cycle apparatus comprises a compressor 2, a condenser 4, an expander 6, an evaporator 8, and refrigerant conveyance tubes 9. The compressor 2 compresses a gaseous refrigerant having a low-temperature and low-pressure to a high-temperature and high-pressure gas, and the condenser 4 condenses the high-temperature and high-pressure gaseous refrigerant to a liquid by taking heat from the gaseous refrigerant. The liquefied high-temperature and high-pressure refrigerant is depressurized by means of the expander 6 to a two-phase refrigerant. Here, the two-phase refrigerant is a mixture of gas and liquid and has a low-pressure and low-temperature. The depressurized refrigerant flows into the evaporator 8, and is then vaporized while absorbing heat from air around the evaporator 8. The compressor 2, the condenser 4, the expander 6 and the evaporator 8 are connected to one another by way of the refrigerant conveyance tubes 9 to enable the refrigerant to circulate therethrough.

The compressor 2 comprises a compression unit having a refrigerant compression chamber, a motor unit for driving the compression unit, and an oil pump for the lubrication of both the compression unit and the motor.

Installed between the compressor 2 and the condenser 4 is an oil separator 10. The oil separator 10 serves to separate oil, discharged from the compressor 2 as shown in a dash-lined arrow, from the gaseous refrigerant, likewise discharged from the compressor 2 as shown in solid-lined arrows.

Not described reference numeral 2a designates an accumulator, which is mounted at the refrigerant conveyance tube 9 near an inlet of the compressor 2. The accumulator 2a is adapted to catch the liquefied refrigerant, not evaporated in the evaporator 8, so as to prevent it from flowing into the compressor 2.

FIG. 2 is a longitudinal sectional view illustrating the conventional oil separator.

The oil separator 10 comprises a casing 12 defining an interior space, an inflow tube 14 for supplying the oil and the gaseous refrigerant into the casing 12, a filtering member 16 mounted in an intermediate region of the casing 12 and adapted to filter oil while allowing the passage of the gaseous refrigerant, causing the filtered oil to drop into a lower region of the casing 12, an oil outflow tube 18 for delivering the dropped oil in the lower region of the casing 12 to the compressor, and a refrigerant outflow tube 20 for supplying the refrigerant, passed through the filtering member 16, to the condenser.

Now, the operation of the conventional cooling-cycle apparatus configured as stated above will be explained.

When the compressor 2 starts to drive, the high-temperature and high-pressure gaseous refrigerant (shown in the solid-line arrows) and the oil (shown in the dash-lined arrow) are simultaneously discharged from the compressor 2, and then are supplied into the casing 12 of the oil separator 10 through the inflow tube 14.

Within the casing 12 of the oil separator 10, the oil collides with the filtering member 16 and forms oil droplets. The oil droplets are easy to drop into the lower region of the casing 12 by gravity, and then return back to the compressor 2 through the oil outflow tube 18.

Meanwhile, the gaseous refrigerant, supplied into the casing 12 of the oil separator 10, is discharged through the refrigerant outflow tube 20 after passing through the filtering member 16.

The gaseous refrigerant, discharged from the outflow tube 20, is condensed while passing through the condenser 4 by discharging heat thereof to the outside, and is successively depressurized while passing through the expander 6 to a two-phase, namely, liquid-containing gaseous refrigerant having a low-pressure and low-temperature. The depressurized two-phase refrigerant flows into the evaporator 8 and is then vaporized by absorbing heat from air around the evaporator 8. Finally, the gaseous refrigerant returns to the compressor 2.

The above described conventional oil separator 10 having a configuration in that the filtering member 16 is mounted therein to filter the oil from the gaseous refrigerant, however, suffers from increased manufacturing costs and complicated installation operation due to the existence of the filtering member 16, and also has a limitation to reduce the overall size thereof. Furthermore, the filtering member 16 fails to completely intercept the passage of the oil, resulting in a low degree of oil separation efficiency.

Accordingly, with the use of the oil separator as stated above, part of the oil supplied into the casing 12 passes through the filtering member 16 and inevitably circulates through the cooling-cycle apparatus together with the refrigerant, causing only a small amount of the oil to return to the compressor 2 through the oil separator 10 and the oil outflow tube 18. This requires filling the cooling-cycle apparatus with an excessive amount of oil over an appropriate value. The greater the amount of the oil circulating through the cooling-cycle apparatus, the lower the efficiency of the cooling-cycle apparatus.

SUMMARY OF THE INVENTION

Therefore, the present invention has been made in view of the above problems, and it is an object of the present invention to provide an oil separator for effectively separating oil from gas.

It is another object of the present invention to provide a cooling-cycle apparatus using an oil separator, which is designed to effectively separate oil from an oil-containing gaseous refrigerant discharged from a compressor in a cyclone separation manner, and to effectively return the separated oil to the compressor, thereby being capable of achieving an improvement in the operational reliability of the compressor.

It is yet another object of the present invention to provide a cooling-cycle apparatus using an oil separator, which can achieve a reduction in size and price by virtue of a simplified interior structure thereof.

In accordance with one aspect of the present invention, the above and other objects can be accomplished by the provision of an oil separator comprising: a casing defining an interior space; an inflow tube connected to a circumferential position of the casing and adapted to supply oil and gaseous refrigerant into the interior space of the casing for allowing them to be separated from each other while flowing in a swirl pattern; and a refrigerant outflow tube for discharging the gaseous refrigerant, separated from the oil, from the casing.

Preferably, the casing may be connected with an oil outflow tube for discharging the oil, separated from the gaseous refrigerant, from the casing.

Preferably, the casing may include a cylindrical portion, and a conical portion defined under the cylindrical portion.

Preferably, the inflow tube may be a straight tube inserted into the casing to come into contact with an inner periphery of the casing.

Preferably, the inflow tube may be inserted into the casing so that an angle formed by an imaginary line, along which the inflow tube is inserted into the casing, and an imaginary line connecting between a refrigerant and oil outlet end of the inflow tube and a center of the casing is in a range of 85° to 95°.

Preferably, the inflow tube may be a bent tube inserted into the casing to extend toward a casing center axis and having a bent refrigerant and oil outlet end.

Preferably, the inflow tube may be positioned so that a refrigerant and oil outlet end thereof is kept at a level higher than a refrigerant inlet end of the refrigerant outflow tube.

In accordance with another aspect of the present invention, the above and other objects can be accomplished by the provision of a cooling-cycle apparatus using an oil separator, comprising: a compressor for compressing gaseous refrigerant and discharging the compressed gaseous refrigerant along with oil contained therein; the oil separator for separating the oil and the gaseous refrigerant, discharged from the compressor, from each other by flowing them in a swirl pattern; and an oil outflow tube for returning the oil, separated in the oil separator, to the compressor.

Preferably, the oil separator may comprise: a casing defining an interior space; an inflow tube connected to a circumferential position of the casing and adapted to supply oil and gaseous refrigerant into the interior space of the casing in a circumferential direction; and a refrigerant outflow tube for discharging the gaseous refrigerant, separated from the oil, from the casing.

Preferably, the casing may include a cylindrical portion, and a conical portion defined under the cylindrical portion.

Preferably, the inflow tube may be a straight tube eccentrically inserted into the casing.

Preferably, the inflow tube may be a straight tube inserted into the casing to come into contact with an inner periphery of the casing.

Preferably, the inflow tube may be inserted into the casing so that an angle formed by an imaginary line, along which the inflow tube is inserted into the casing, and an imaginary line connecting between a refrigerant and oil outlet end of the inflow tube and a center of the casing is in a range of 85° to 95°.

Preferably, the inflow tube may be a bent tube having a bent refrigerant and oil outlet end.

Preferably, the outlet end of the bent tube may be configured so that a bending angle thereof is greater than 0° and less than 90°.

Preferably, the bent tube may be inserted into the casing to extend toward a casing center axis.

Preferably, the inflow tube may be positioned so that a refrigerant and oil outlet end thereof is kept at a level higher than a refrigerant inlet end of the refrigerant outflow tube.

Preferably, the refrigerant outflow tube may be positioned so that a refrigerant inlet end thereof is located within a range of 30% to 70% of the entire height of the casing.

Preferably, the refrigerant outflow tube may be a straight tube inserted vertically into the casing through an upper surface of the casing.

Preferably, the refrigerant outflow tube may be a bent tube inserted horizontally into the casing through a peripheral wall of the casing and having a bent refrigerant inlet end.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
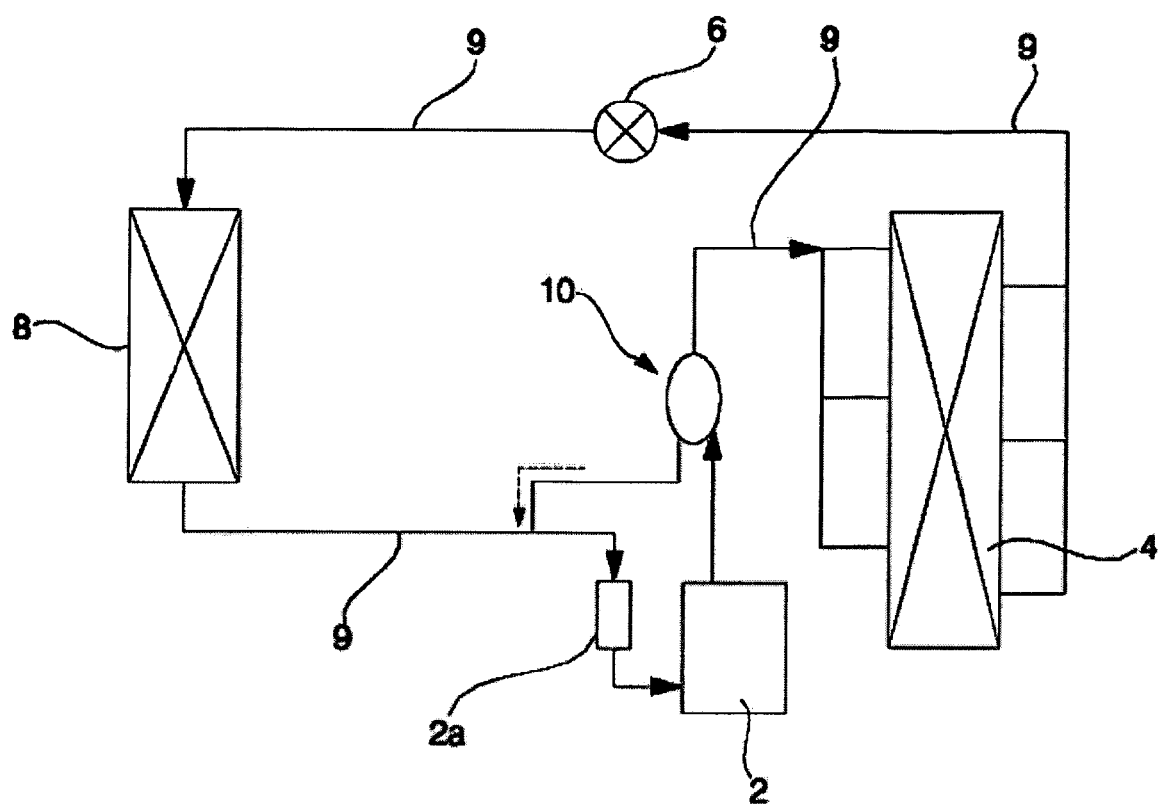
FIG. 1 is a diagram of a cooling-cycle apparatus.
Figure 2:
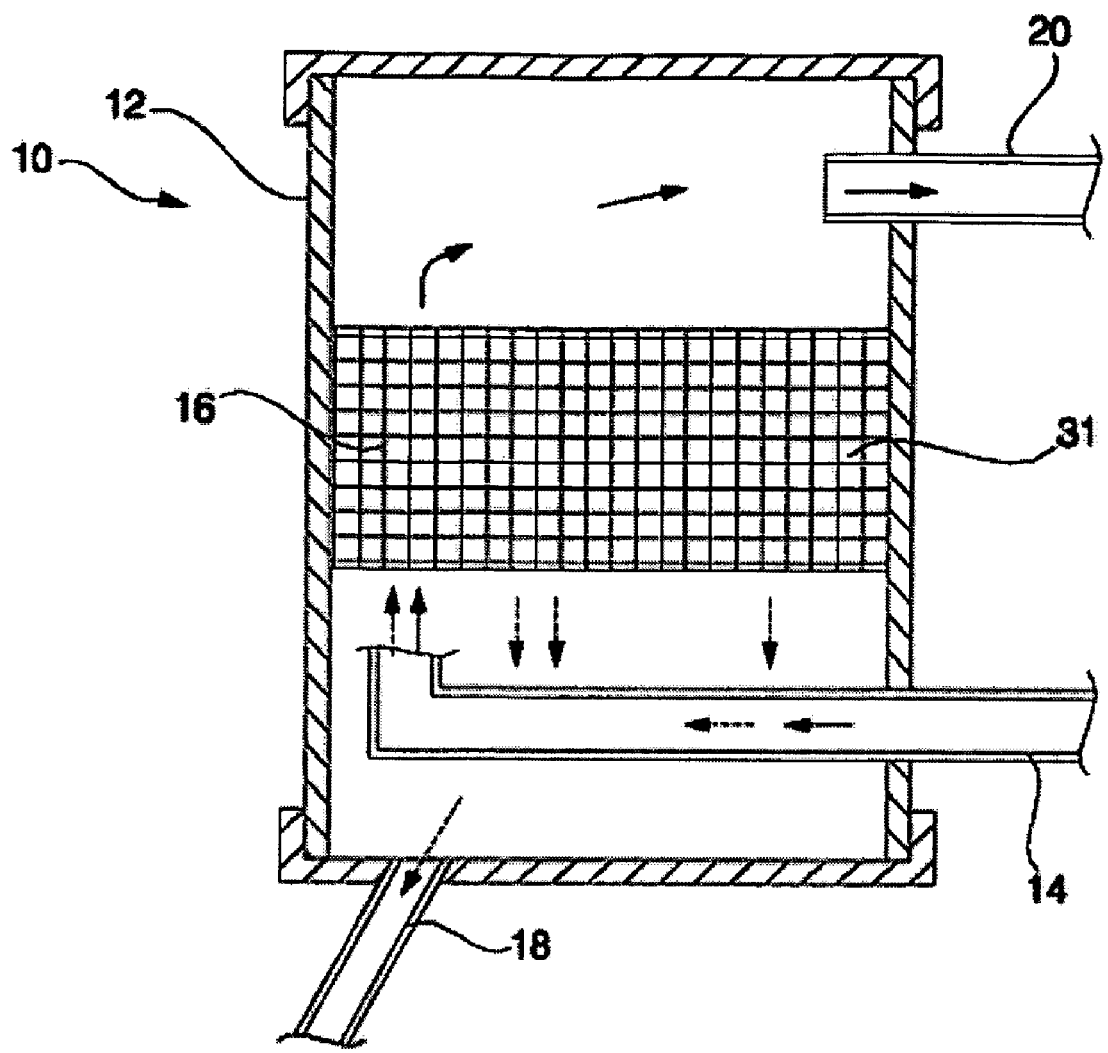
FIG. 2 is a longitudinal sectional view illustrating a conventional oil separator.

Now, preferred embodiments of the present invention will be explained with reference to the accompanying drawings. In the following description, the same or similar elements are denoted by the same reference numerals even though they are depicted in different drawings, and thus a detailed description thereof will be omitted when it may make the subject matter of the present invention rather unclear.

Figure 3:
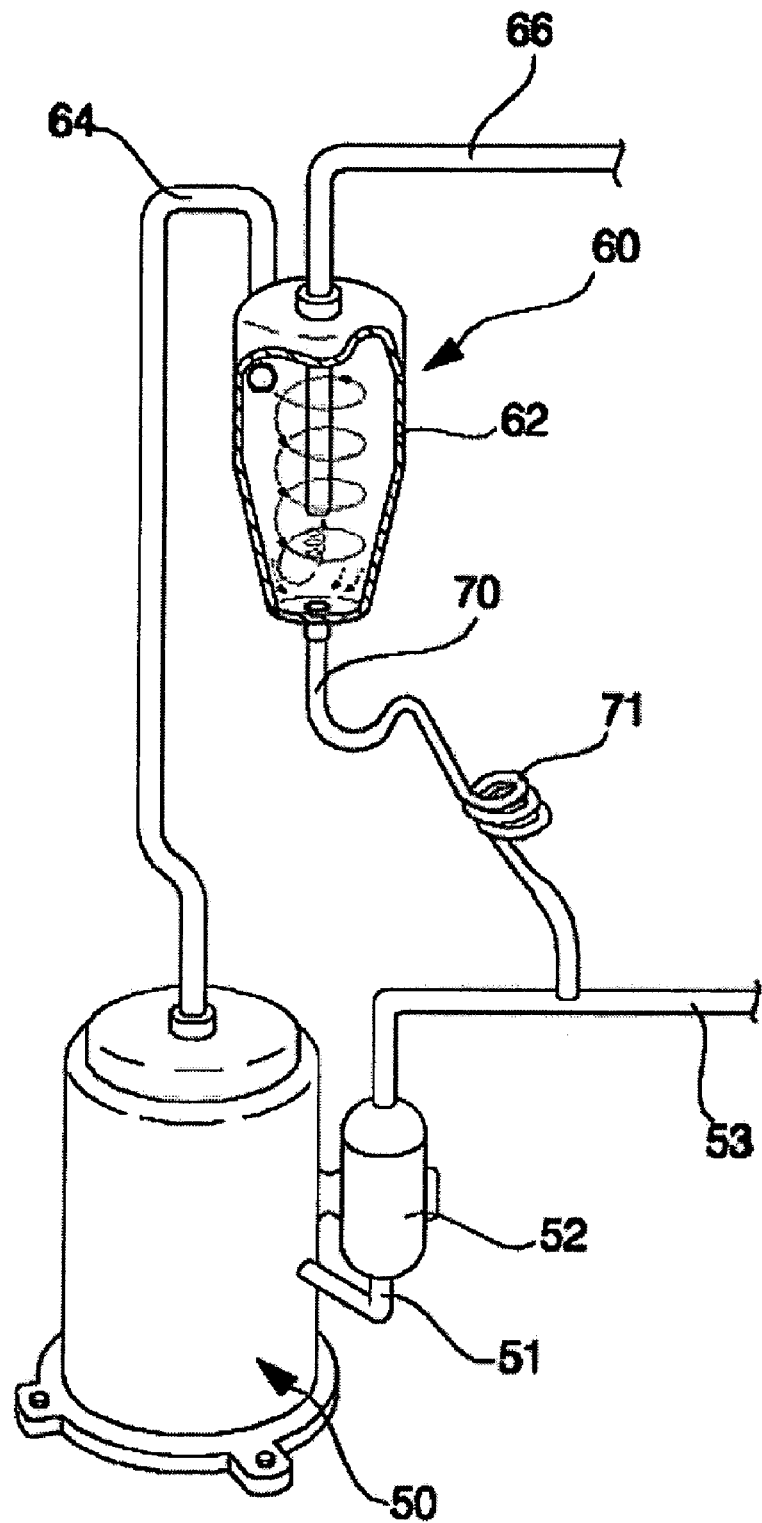
FIG. 3 is a partially cut-away perspective view illustrating a cooling-cycle apparatus using an oil separator in accordance with the present invention.

FIG. 3 is a partially cut-away perspective view illustrating a cooling-cycle apparatus using an oil separator in accordance with the present invention.

As shown in FIG. 3, the cooling-cycle apparatus using the oil separator according to the present invention comprises a compressor 50, a condenser, an expander, an evaporator, refrigerant conveyance tubes, an oil separator 60, and an oil outflow tube 70. The compressor 50 compresses a gaseous refrigerant and discharges it, along with oil contained therein. In the condenser, the high-temperature and high-pressure gaseous refrigerant is condensed to a liquid through heat emission. The liquefied refrigerant is depressurized by the expander to a two-phase, namely, liquid-containing gaseous refrigerant having a low-pressure and low-temperature. Then, while passing through the evaporator, the depressurized refrigerant is vaporized while absorbing heat from air around the evaporator. The compressor, the condenser, the expander and the evaporator are connected to one another by way of the refrigerant conveyance tubes to enable the refrigerant to circulate therethrough. The oil and the gaseous refrigerant, discharged from the compressor 50, are separated from each other within the oil separator 60 as they flow in a swirl pattern, and then are returned to the compressor 50 via the oil outflow tube 70.

The compressor 50 is connected at a circumferential position thereof to an end of a refrigerant suction tube 51, and the other end of the refrigerant suction tube 51 is connected to a lower end of an accumulator 52. The accumulator 52 is adapted to catch the liquefied refrigerant, not evaporated by the evaporator, so as to prevent it from flowing into the compressor 50.

The accumulator 52 is connected at an upper end thereof to an evaporator connection tube 53, which guides the refrigerant passed through the evaporator.

The oil separator 60 comprises a casing 62 defining an interior space, an inflow tube 64 connected to a circumferential portion of the casing 62 for supplying the oil and the gaseous refrigerant into the casing 62 in a circumferential direction, and a refrigerant outflow tube 66 for discharging the gaseous refrigerant, separated from the oil, upward from the casing 62.

The oil outflow tube 70 is provided with a capillary tube 71 for facilitating the recovery of the oil, and is connected to one of the refrigerant suction tube 51, the accumulator 52 and the evaporator connection tube 53.

Figure 4:
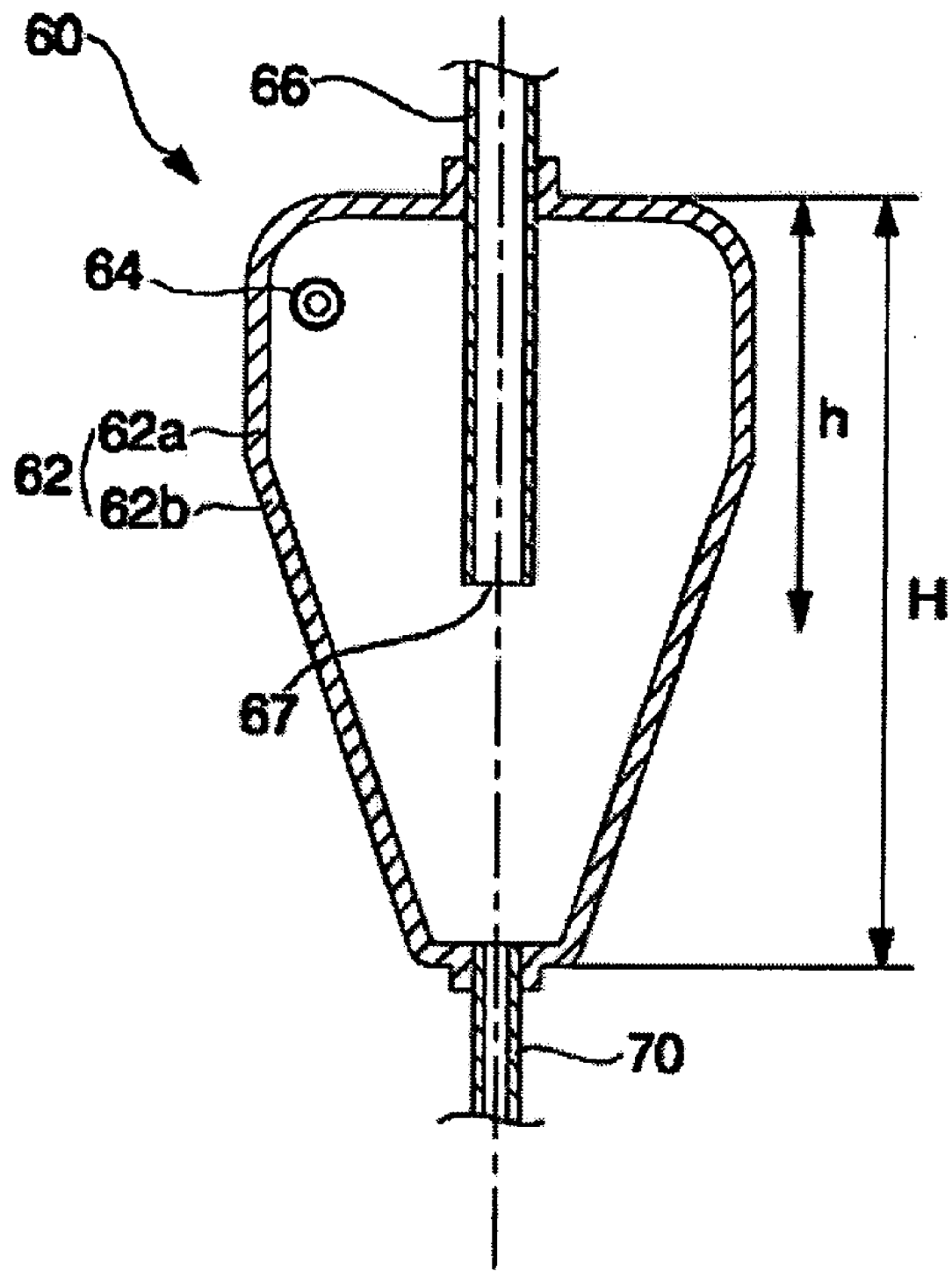
FIG. 4 is a longitudinal sectional view illustrating an oil separator in accordance with a first embodiment of the present invention.
Figure 5:
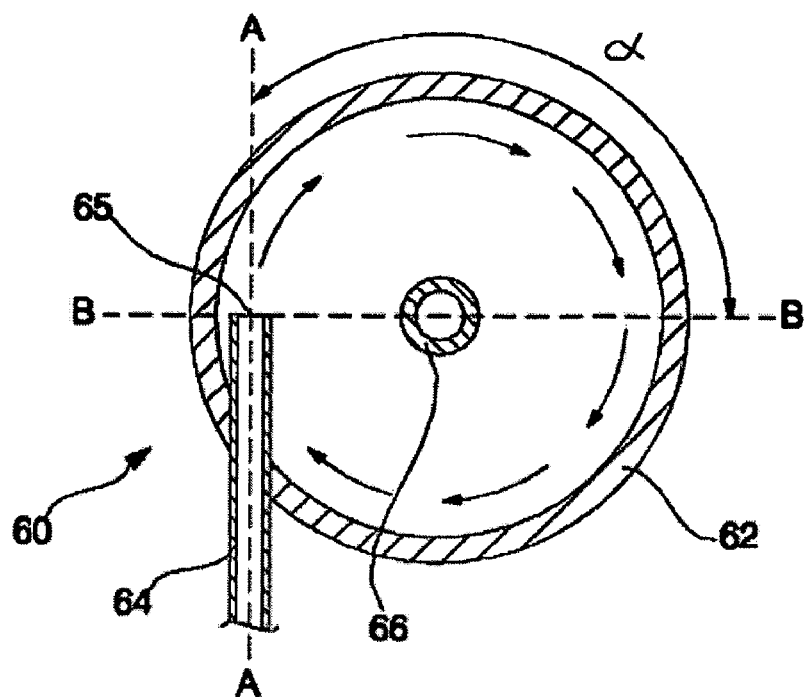
FIG. 5 is a cross sectional view of the oil separator in accordance with the first embodiment of the present invention.

FIGS. 4 and 5 are a longitudinal sectional view and a cross sectional view, respectively, illustrating an oil separator in accordance with a first embodiment of the present invention.

As shown in FIGS. 4 and 5, the casing 62 of the oil separator 60 includes a cylindrical portion 62a to which the inflow tube 64 is inserted, and a conical portion 62b defined under the cylindrical portion 62a.

The inflow tube 64 is a straight tube eccentrically inserted in the casing 62 for supplying the oil and the gaseous refrigerant into the casing 62 in a direction deviating from a casing center axis. Preferably, the inflow tube 64 is inserted into the casing 62 to come into contact with an inner periphery of the casing 62.

With such an insertion structure, an angle a formed by an imaginary line A-A, along which the inflow tube 64 is inserted into the casing 62, and an imaginary line B-B connecting between a refrigerant and oil outlet end 65 of the inflow tube 64 and a center of the casing 62 is in a range of 85° to 95°.

The inflow tube 64 is positioned so that the refrigerant and oil outlet end 65 thereof is kept at a level higher than a refrigerant inlet end 67 of the refrigerant outflow tube 66.

The refrigerant outflow tube 66 is inserted vertically into the casing 62 through an upper surface of the casing 62 to extend in the casing 62 by a predetermined length h.

With such a configuration, in the interior space of the casing 62 is defined a swirl flow path between an inner peripheral wall surface of the casing 62 and an outer peripheral surface of the refrigerant outflow tube 66.

The refrigerant outflow tube 66 is positioned so that the refrigerant inlet end 67 thereof is located within a range of 30% to 70% of the entire height H of the casing 62. This prevents part of the oil, flowing within an upper or middle region of the casing 62 in a swirl pattern, from flowing into the refrigerant outflow tube 66.

That is, a ratio of the length h of the refrigerant outflow tube 66 extending in the casing 62 to the entire height H of the casing 62 is from 0.3 to 0.7.

Now, the operation and effects of the above described embodiment will be explained.

Upon driving the compressor 50, the high-temperature and high-pressure gaseous refrigerant is discharged from the compressor 50, along with the oil contained in the compressor 50. Both the discharged gaseous refrigerant and the oil flow into the casing 62 of the oil separator 60 through the inflow tube 64.

That is, after passing through the inflow tube 64, the gaseous refrigerant and the oil are supplied into the casing 62 in a direction of the refrigerant and oil outlet end 65 of the tube 64, namely, in a direction deviating from the casing center axis, thereby flowing in a swirl pattern along inner peripheral wall surfaces of both the cylindrical portion 62a and the conical portion 62b.

When both the gaseous refrigerant and the oil flow downward in the swirl pattern along the inner peripheral wall surface of the casing 62, specifically, of the conical portion 62b, collision between oil particles is intensified, causing the oil particles to be conglomerated. This makes it easy to centrifugally separate the oil from the gaseous refrigerant due to a difference between specific gravities of the oil and the gaseous refrigerant.

The oil, separated from the gaseous refrigerant, runs down the inner peripheral wall surface of the casing 62 into a lower region of the casing 62, and is discharged through the oil outflow tube 70, so as to be returned to the compressor 50.

Meanwhile, the gaseous refrigerant, separated from the oil, is gathered in the center of the lower region of the casing 62, specifically, of the conical portion 62b, and forms a rising swirl stream. As the gaseous refrigerant flows upward in a swirl pattern, the oil, still remaining in the refrigerant, can be separated due to gravity. The upwardly flown gaseous refrigerant is discharged from the casing 62 through the refrigerant outflow tube 66.

After passing through the outflow tube 66, the gaseous refrigerant is condensed through heat emission, and then the liquefied refrigerant is depressurized while passing through the expander to the two-phase, namely, liquid-containing gaseous refrigerant having a low-pressure and low-temperature. After that, while passing through the evaporator, the depressurized refrigerant is vaporized while absorbing heat from air around the evaporator, thereby being circulated into the compressor in a gaseous state, along with the oil passed through the oil outflow tube 70.

Figure 6:
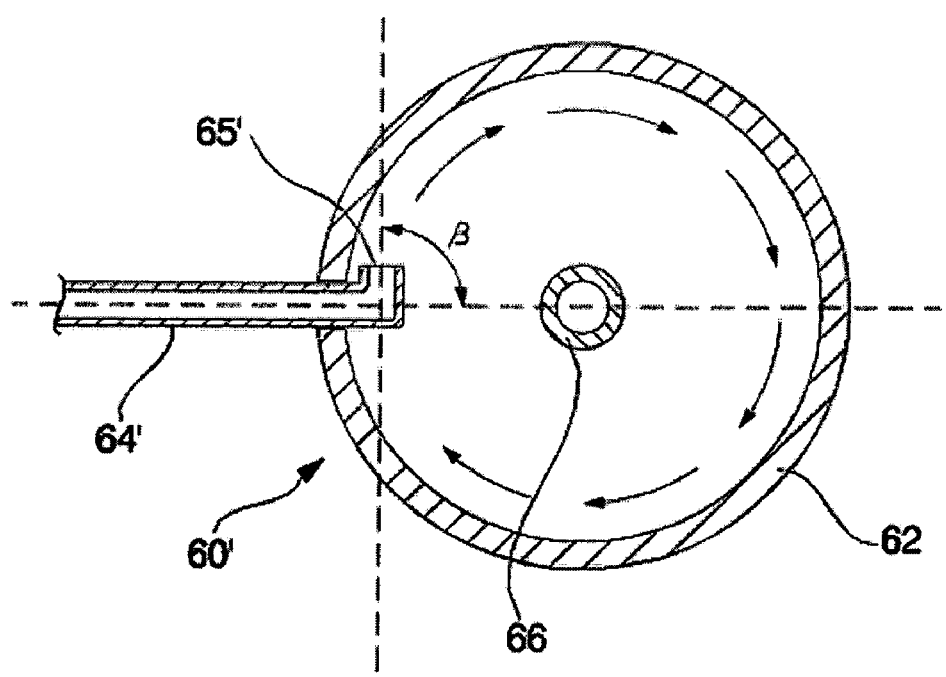
FIG. 6 is a cross sectional view illustrating an oil separator in accordance with a second embodiment of the present invention.

FIG. 6 is a cross sectional view illustrating an oil separator in accordance with a second embodiment of the present invention.

As shown in FIG. 6, the oil separator 60' of the second embodiment comprises an inflow tube 64' in the form of a bent tube. That is, the inflow tube 64' has a bent refrigerant and oil outlet end 65'.

In the bent tube 64', a bending angle β of the outlet end 65' is greater than 0° and less than 90°.

The bent tube 64' is inserted into the casing 62 to extend toward the casing center axis.

Figure 7:
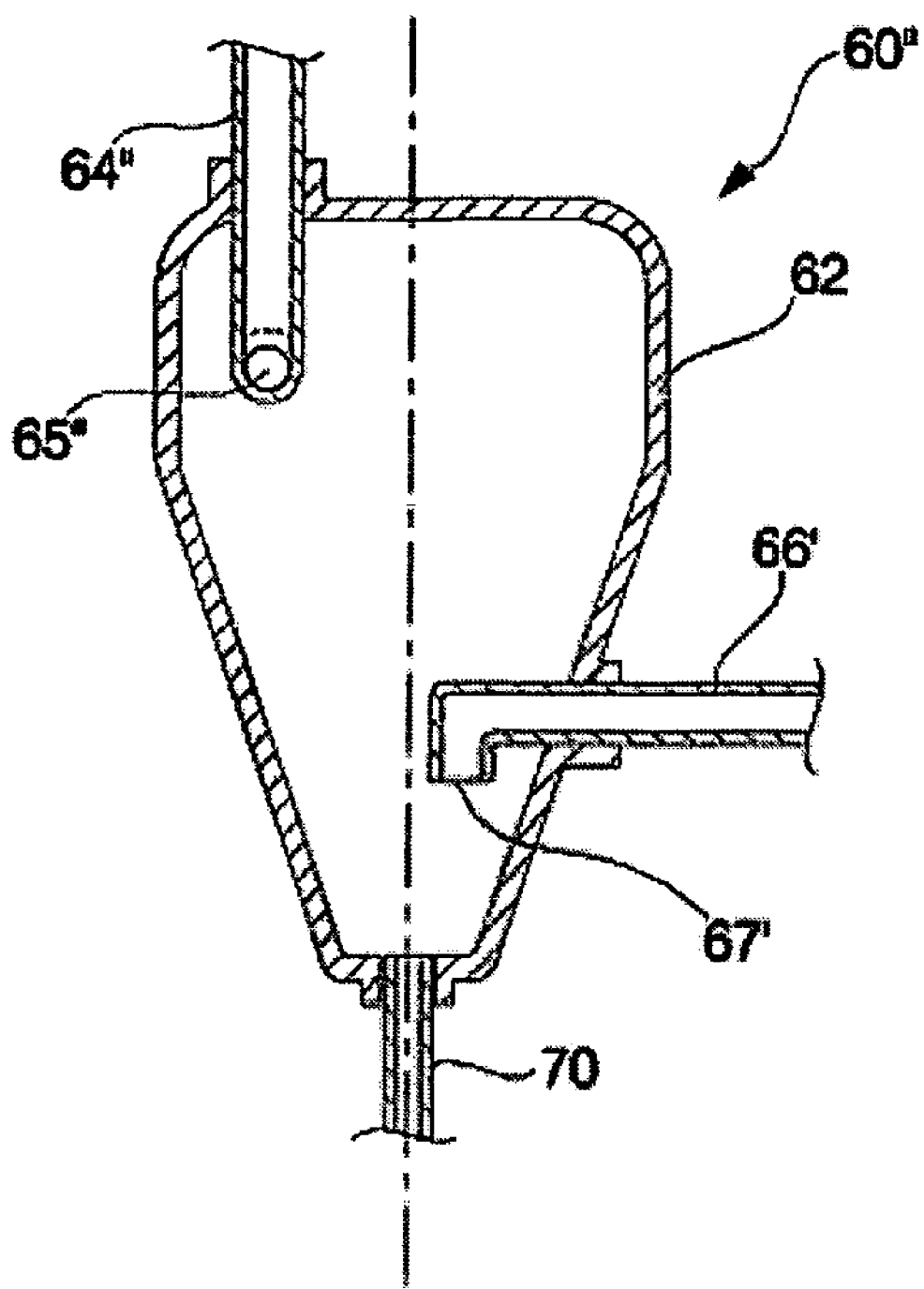
FIG. 7 is a longitudinal sectional view illustrating an oil separator in accordance with a third embodiment of the present invention.

FIG. 7 is a longitudinal sectional view illustrating an oil separator in accordance with a third embodiment of the present invention.

As shown in FIG. 7, the oil separator 60" of the third embodiment comprises a refrigerant outflow tube 66', which is inserted horizontally into the casing 62 through a peripheral wall thereof, and has a bent refrigerant inlet end 67'.

The oil separator of the third embodiment further comprises an inflow tube 64", which is inserted vertically into the casing 62 through the upper surface of the casing 62, and has a bent outlet 65".

As apparent from the above description, an oil separator and a cooling-cycle apparatus using the same according to the present invention has several advantages as follows:

First, according to the oil separator of the present invention, an inflow tube is connected to a casing of the oil separator to supply oil and gaseous refrigerant into the casing, so as to cause them to be separated from each other while flowing in a swirl pattern in the casing in a cyclone separation manner, resulting in an improved oil separation efficiency.

Second, as a result of returning the oil, completely separated from the gaseous refrigerant through the above described cyclone separation manner, into a compressor through an oil outflow tube, the cooling-cycle apparatus of present invention can achieve an improvement in an oil recovery efficiency and reliability thereof.

Third, in the cooling-cycle apparatus using the oil separator of the present invention, oil particles are conglomerated through collision so as to be centrifugally separated from the gaseous refrigerant as a result of swirl flowing of the oil within the casing. This has the effect of eliminating the use of a conventional oil filtering member, simplifying the structure of the oil separator and achieving an inexpensive oil separator.

Fourth, through a configuration in that the casing of the oil separator is divided into an upper cylindrical portion and a lower conical portion, when gaseous refrigerant flows upward from the conical portion in the swirl pattern, the remaining oil can be completely separated from the gaseous refrigerant, achieving an improvement in the oil recovery efficiency and discharge of the gaseous refrigerant.

Fifth, according to the present invention, the inflow tube takes the form of a straight tube eccentrically inserted into the casing, or takes the form of a bent tube having a bent refrigerant and oil outlet end. This enables the gaseous refrigerant and the oil to be supplied into the casing in a direction deviating from a casing center axis, and allows the tube to be easily installed to the casing.

Sixth, according to the present invention, since the inflow tube is positioned so that the refrigerant and oil outlet end thereof is kept at a level higher than a refrigerant inlet end of a refrigerant outflow tube, it is possible to prevent part of the oil supplied into the casing from directly flowing into the outflow tube, resulting in an increased oil recovery efficiency.

Finally, since the refrigerant outflow tube takes the form of a straight tube protruding vertically into the casing through an upper surface of the casing, or takes the form of a bent tube protruding horizontally into the casing through a peripheral wall of the casing and having a bent inlet, the discharge of the gaseous refrigerant as well as the installation of the outflow tube can be simplified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling-cycle apparatus using an oil separator, comprising:
    a compressor for compressing gaseous refrigerant and discharging the compressed gaseous refrigerant along with oil contained therein;
    the oil separator for separating the oil and the gaseous refrigerant, discharged from the compressor, from each other by flowing them in a swirl pattern; and
    an oil outflow tube for returning the oil, separated in the oil separator, to the compressor,
    wherein the oil separator comprises:
    a casing defining an interior space;
    an inflow tube connected to a circumferential position of the casing and adapted to supply oil and gaseous refrigerant into the interior space of the casing in a circumferential direction; and
    a refrigerant outflow tube for discharging the gaseous refrigerant, separated from the oil, from the casing,
    wherein the inflow tube comprises a tube inserted vertically into the casing through an upper surface of the casing and having a bent refrigerant and oil outlet end from which the oil and gaseous refrigerant is discharged into the casing in the swirl pattern,
    wherein the refrigerant outflow tube comprises a tube inserted horizontally into the casing through a peripheral wall of the casing and having a bent refrigerant inlet end,
    wherein the casing includes a cylindrical portion, and a conical portion defined under the cylindrical portion, and
    wherein the bent refrigerant and oil outlet end is positioned at the cylindrical portion, and the bent refrigerant inlet end is positioned at the conical portion.

2. The apparatus as set forth in claim 1, wherein the casing is connected with an oil outflow tube for discharging the oil, separated from the gaseous refrigerant, from the casing.

3. The apparatus as set forth in claim 1, wherein the inflow tube is positioned so that a refrigerant and oil outlet end thereof is kept at a level higher than a refrigerant inlet end of the refrigerant outflow tube.

* * * * *